M. C. HUGGINS.
SAW CLAMP.
APPLICATION FILED FEB. 10, 1919.
1,324,594.
Patented Dec. 9, 1919.
2 SHEETS—SHEET 1.
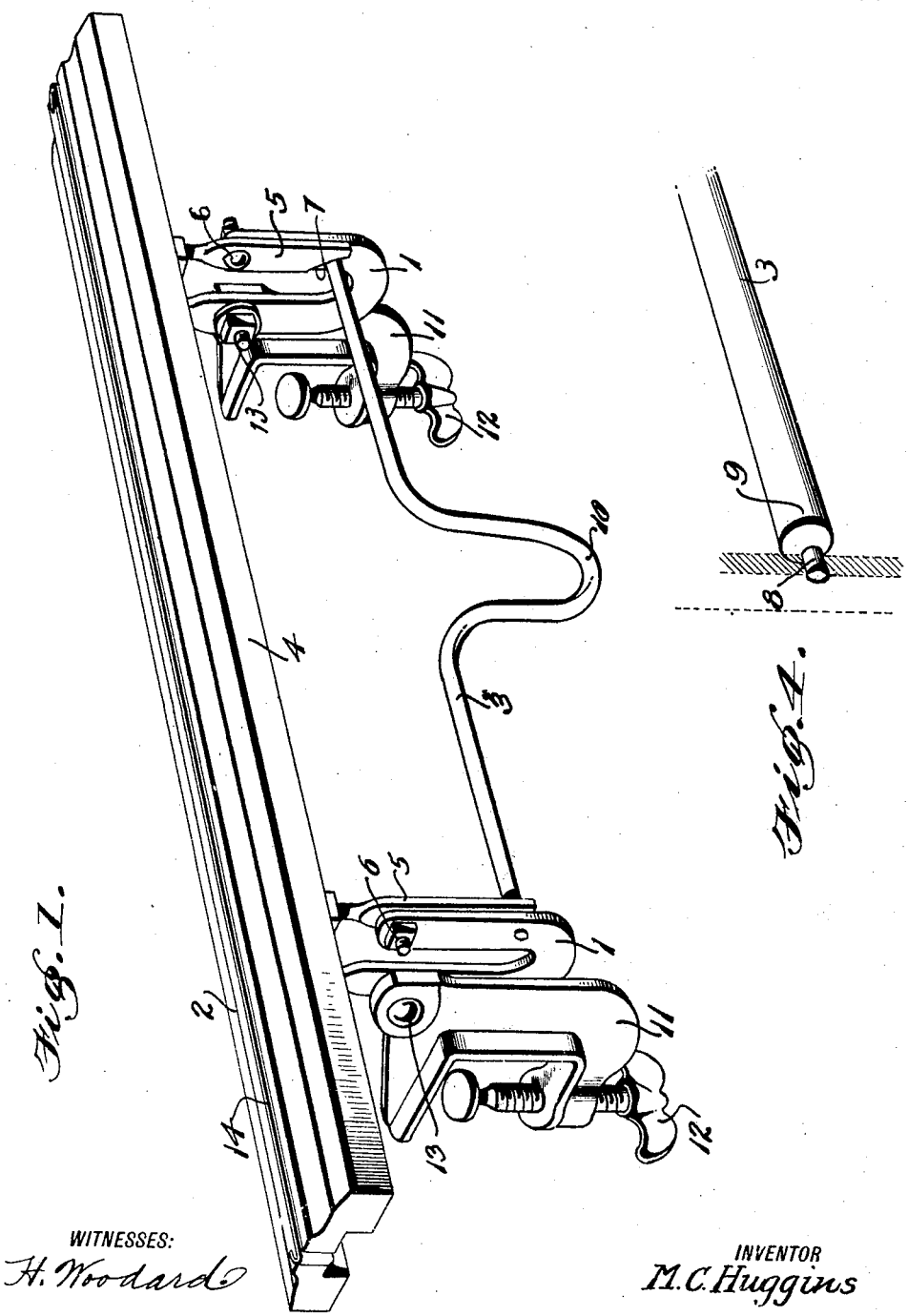
WITNESSES:
H. Woodard
INVENTOR
M. C. Huggins
BY
Robb & Robb
ATTORNEYS

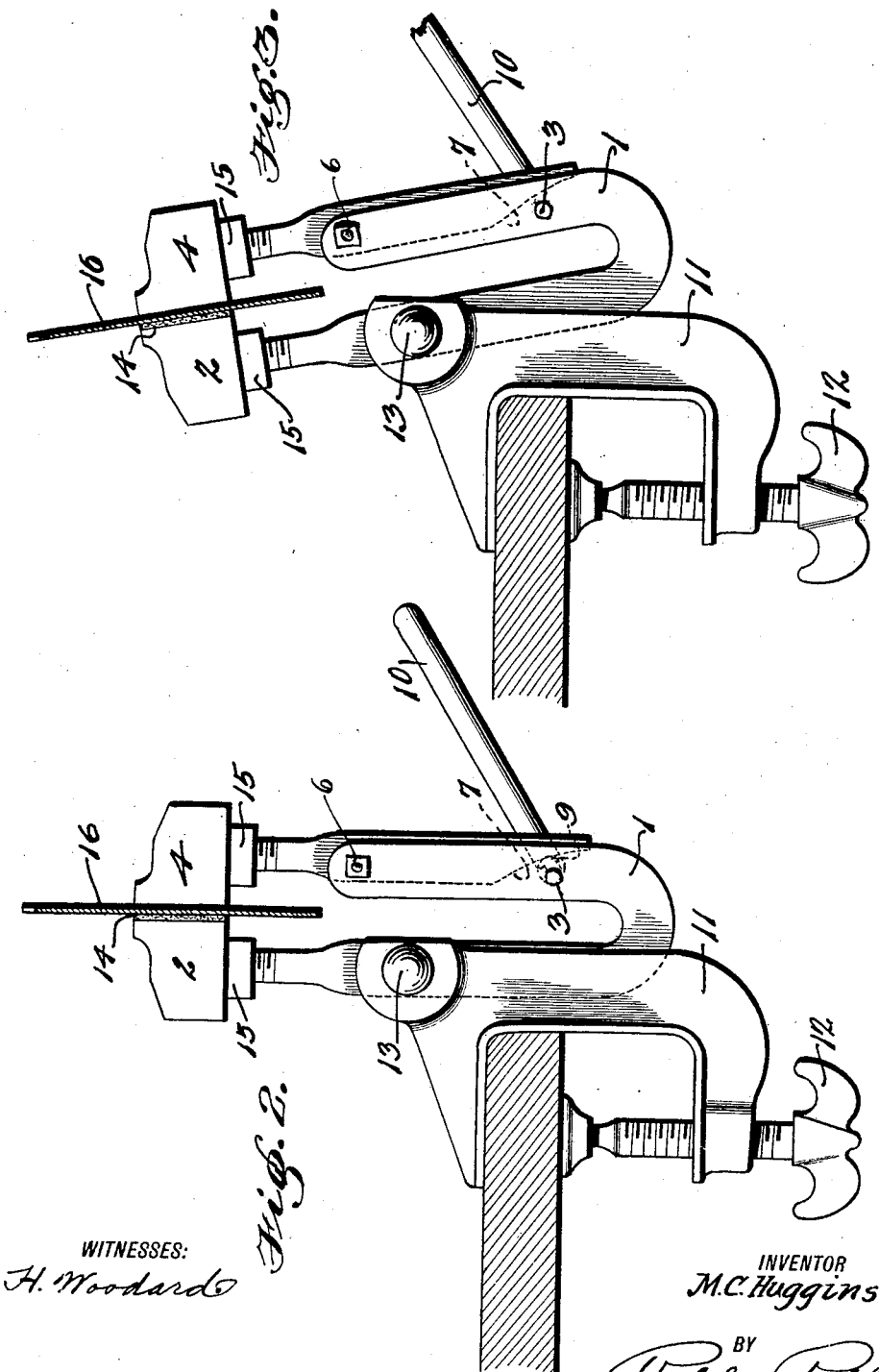

UNITED STATES PATENT OFFICE.

MINGUS C. HUGGINS, OF HENDERSONVILLE, NORTH CAROLINA.

SAW-CLAMP.

1,324,594. Specification of Letters Patent. Patented Dec. 9, 1919.

Application filed February 10, 1919. Serial No. 276,063.

*To all whom it may concern:*

Be it known that I, MINGUS C. HUGGINS, a citizen of the United States, residing at Hendersonville, in the county of Henderson and State of North Carolina, have invented certain new and useful Improvements in Saw-Clamps, of which the following is a specification.

The present invention appertains to improvements in what are commonly known as saw-clamps, designed to hold saws while dressing the teeth thereof.

It has been my object to provide a device of this character which will most effectively aid the operator in sharpening the saw while holding the same quite rigid throughout its length and permitting the positioning of said saw at a suitable angle to provide the proper reflection of light on the teeth to enable it to be determined more easily when the proper amount of filing has been done.

A further object in view is to provide a clamp having a minimum number of parts so that it may be cheaply manufactured and easily operated to perform its clamping function.

To this end my invention consists of a saw frame having a movable clamping jaw adapted to be actuated by a suitable cam device, said frame being adjustably mounted upon bench attaching means whereby the jaws and the saw held thereby may be adjusted to the proper angular position for work upon the teeth as heretofore premised.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a perspective view of my invention;

Fig. 2 is an end elevation thereof showing the saw held in the clamping saw frame;

Fig. 3 is a similar view to Fig. 2, showing the saw frame adjusted to an angular position upon its supporting clamps; and Fig. 4 is a fragmentary detail perspective view, showing one end of the cam element for producing the clamping action of the movable jaw.

Throughout the following detail description and on the several figures of the drawings, similar parts are referred to by like reference characters.

Referring to the drawings 1 designates a pair of U-shaped members arranged in spaced relation and which for the purpose of this description will be termed the saw frame, said members being connected at one side by the relatively stationary jaw member 2 and at the other side by the rod 3, which as this description proceeds will be found to constitute actuating means for the movable jaw 4, which in turn connects the spaced movable jaw members 5. Each of these last mentioned members 5 is pivotally connected to its particular U-shaped member 1 on the pivot bolt 6 at the upper end of said member. The lower end of each member extends to a point adjacent to one end of the connecting rod 3 as will be more apparent by reference to Figs. 2 and 3. The edge of this lower end as indicated at 7 is cut-away and coacts with the rod 3, which when turned will move the member 5 and impart clamping action to the movable jaw. In order to accomplish this the rod 3 is peculiarly formed in that the trunnion like extensions 8 at its opposite ends, which are the pivots engaging in the U-shaped members 1, are located at one side of the central longitudinal axis of the rod 3, so that the surface 9 at each end of the rod constitutes a cam which operates as before described to shift its adjacent jaw member 5 to produce the clamping action as stated. At a central point the rod 3 is bent outwardly as shown at 10 to form a manipulating handle for rotating the rod most easily.

The saw frame which has just been described is mounted upon bench clamps 11 which are of conventional form and provided with the set screws 12 for securing the clamps in position upon any convenient support. The important feature of this arrangement lies in the pivotal connection of the saw frame to these clamps as at 13, designating bolts which provide a sufficient amount of friction to hold the saw frame at the desired position while permitting the said position to be changed by the operator. These bolts may be tightened, obviously, so as to prevent the saw frame from being accidentally shifted once the position has been determined.

A comparison of Figs. 2 and 3 will disclose the manner in which the position of the saw frame may be varied and this is important for the reasons pointed out at the outstart of this specification. The jaws 2 and 4 are preferably painted black and this, to the person who has had experience in filing saws, is desirable because it produces the proper background for the teeth to enable the filer to most readily see just when the right amount of filing has been done.

As further details of construction one of the jaw members may be provided with a suitable covering 14 of any desired material which will aid in holding the saw against displacement. One leg of each of the U-shaped members 1, as well as the upper end of each of the jaw members 5 is threaded so as to be screwed into the respective jaws 2 and 4 and enable said jaws to be properly alined in parallel relation to each other, nuts 15 being provided to hold the jaws at the proper determined position.

In the use of the apparatus, the operator will attach the frame to any suitable support such as a work bench or table by means of the clamps 11, whereupon the cam rod 3 is rotated by moving the handle 10 to its lowermost position, such as shown in Fig. 1, thus permitting the jaws 2 and 4 to open and enabling the saw to be placed in position therebetween as shown at 16 in Figs. 2 and 3.

The cam member 3 is now rotated in the reverse direction causing the cam surfaces 9 to act upon the members 5 which are shifted on their pivots to thereby move the jaw 4 and produce the clamping action against the saw. It will be apparent that only a small amount of movement is required to obtain a very tight clamping action by reason of the length of the lower ends of the members 5, so that no difficulty is experienced in very tightly holding the saw against displacement accidentally. The fact that the jaws 2 and 4 are of such length as to extend substantially the full length of the saw is also an important feature because the operator is not required to shift the saw once it has been placed in position which would be likely to change the angle of filing of the teeth.

Considering the apparatus as a whole, it will be observed to be simple and strong in its arrangement and construction of parts, which is desirable in an apparatus of this type.

Having thus described my invention, what I claim as new is:

1. A saw-clamp of the class described, comprising a pair of spaced U-shaped frame members, a relatively stationary jaw attached at one side of and connecting said U-shaped members, a relatively movable jaw member adapted to coöperate with the stationary jaw member including means connecting said movable jaw member to the other side of the U-shaped members aforesaid, pivots for said last mentioned means, a cam rod on said U-shaped members to actuate the movable jaw, and bench clamps to which said U-shaped members are pivotally connected at an intermediate point in their length.

2. A saw-clamp of the class described, comprising a saw frame, jaws vertically adjustably mounted upon said frame to enable said jaws to be raised or lowered with reference to each other, means for holding said jaws at adjusted position, and means for actuating one of said jaws to produce clamping action.

3. A saw-clamp of the class described, comprising a saw frame, jaws adjustably mounted upon said frame to enable said jaws to be positioned in parallel relation, means for holding said jaws at adjusted position, and actuating means for shifting one of said jaws with relation to the other, comprising a rod pivotally connected to the saw frame, said pivoted connections being off-center with respect to the axis of the rod to provide cam surfaces for engagement with one of the jaw members in the manner aforesaid.

In testimony whereof I affix my signature.

MINGUS C. HUGGINS.